United States Patent

[11] 3,609,084

[72] Inventor Norbert Loye
Montreuil-Sous-Bois, France
[21] Appl. No. 729,430
[22] Filed May 15, 1968
[45] Patented Sept. 28, 1971
[73] Assignee Compagnie Des Ferrites Electroniques-Cofelec
Paris, France
[32] Priority May 18, 1967
[33] France
[31] 106,813

[54] LITHIUM FERRITE COMPOSITION FOR MAGNETIC MEMORY ELEMENTS AND MANUFACTURING PROCESS THEREOF
4 Claims, No Drawings

[52] U.S. Cl. ........................................ 252/62.59, 252/62.61
[51] Int. Cl. ........................................ C04b 35/26
[50] Field of Search ........................................ 252/62.61, 62.57, 62.59

[56] References Cited

UNITED STATES PATENTS

| | | | |
|---|---|---|---|
| 3,394,082 | 7/1968 | Hildebrandt ................. | 252/62.61 |
| 3,483,126 | 12/1969 | Sara et al. ...................... | 252/62.6 |
| 3,293,184 | 12/1966 | Van Driel et al. ............. | 252/62.61 |

*Primary Examiner*—Robert D. Edmonds
*Attorney*—Edwin E. Greigg

ABSTRACT: A composition comprising by mole percent: $Fe_2O_3$: 50 to 80 percent; $Li_20$: 8 to 18 percent, at least one oxide chosen from the following group: MgO, $A1_2O_3$, CaO, $Cr_2O_3$, NiO, CuO, ZnO, CdO: 0 to 10 percent; Mn0: 0 to 40 percent; $SiO_2$ up to 5 percent. The temperature of 1,200° C. is never exceeded in the course of the preparation.

The Curie point is above 500° C.

LITHIUM FERRITE COMPOSITION FOR MAGNETIC MEMORY ELEMENTS AND MANUFACTURING PROCESS THEREOF

The present invention relates to ferrite compositions for magnetic memory elements and to a method of manufacturing such ferrites.

Such memory elements have a rectangular hysteresis cycle and retain the information received as current pulses of opposite signs in the form of their remanent magnetization, which is positive or negative according to the polarity of these pulses ("zero" and "one" states of the memory).

The current pulses are characterized by their intensity I*n*, their rise time T*r*, their decay time T*f* and their duration T*d*.

T*s* will designate the time elapsed between the moment when the control current reaches 10 percent of its maximum value and the moment when the electromotive force *d*V1 induced in a conductor, extending across the element, drops to 10 percent of its maximum value.

T*p* will designate the time elapsed between the moment when the control current reaches 10 percent of its value and the moment when the induced electromotive force *d*V1 is at its maximum.

For reason of economy, I*n* should be as low as possible and for reasons of fast control, T*s* should be reduced to a minimum.

To avoid a substantial heating of the control wires and/or the use of expensive thermostatically controlled enclosures, one is lead to use memories whose Curie point, all other things being equal, is high, which results in a low temperature coefficient, i.e. a low variation of the electromotive force induced by a reading pulse as a function of the temperature $\theta$ (in practice $<10^{12}$v. per degree). This coefficient is hereinafter defined as being equal to $[d(uV1)]/[(uV1)d\theta]$.

As a matter of fact, the conditions under which such elements are grouped in actual practice in matrices, result in the fact that the current in adjacent cores should be taken into consideration during write-in and readout operations.

Let *u*V1 (undisturbed voltage 1) be the maximum value of the electromotive force induced in a conductor extending through the elements after the same has first received a recording by a pulse of current I*n* with a given polarity, when its magnetic state is "switched" by a pulse I*n* of equal magnitude and opposite polarity.

Let *d*V1 (disturbed voltage 1) be the maximal value of the electromotive force induced in a conductor extending through the element, when the latter being in the 1 state is read out or cleared by a negative pulse I*n* and has previously received one or more pulses I*n*/2.

Let *d*Vz (disturbed voltage 0) be the maximum value of the induced electromotive force, in a conductor extending through the element, when the latter is in the 0 state and is read by a negative pulse I*n* (see J. C. Quartly, Square Loop Ferrite Circuitry Practice, Prentice-Hall Inc. 1963, page 21).

In order to be usable, the elements or cores in question must have, among others a ratio *d*V1/*d*Vz equal to more than 3.

There are known compositions of lithium ferrites used in the manufacture of magnetic memory elements, which have a high Curie point, associated with good rectangularity of the hysteresis cycle. Their molar percentage composition is within the following range:

$Fe_2O_3$: 50–80 percent; $Li_2O$: 8–18 percent; one or more oxides selected among the following oxides: MgO, $Al_2O_3$, CaO, $Cr_2O_3$, NiO, CuO, ZnO, CdO: 0–10 percent; MnO: 0 to 40 percent. (1)

However, all these compositions have the drawback that, when they are used in the manufacture of magnetic memory elements, the higher their Curie point, the higher also their control current I*n*, or, with a given control current, the longer the switching period T*s*.

To reduce the control current necessary, especially with large diameter cores, for example larger than 2 mm., the latter are "overcooked" by increasing either the duration of the sintering, or the sintering temperature. For avoiding excessively long sintering durations, which are hardly compatible with a mass production, the temperature is raised. However, a difficulty is then encountered in that, at the required temperature, which may be about 1.250° C., the lithium Oxide dissociates itself from the spinel mesh.

It is an object of this invention to eliminate the above-mentioned drawbacks.

According to the invention, there is provided a lithium ferrite composition for magnetic memory elements, having a rectangular hysteresis curve and a Curie point above 500° C. comprising by mole percent:

$Fe_2O_3$: 50 to 80 percent; $Li_2O$: 8 to 18 percent; at least one oxide from the following group: MgO, $Al_2O_3$, CaO, $Cr_2O_3$, NiO, CuO, ZnO, CdO: 0 to 10 percent; $SiO^2$: 1 to 5 percent; MnO: 0 to 40 percent, and sintered at a temperature not exceeding 1,200° C., in an atmosphere containing oxygen.

The lithium ferrite compositions according to the invention provide a better compromise between the temperature coefficient $[d(uV1)]/[(uV1)d\theta]$, the control current I*n* and the switching time T*s*, than the known above-mentioned compositions.

The invention also relates to a method for manufacturing core elements whilst eliminating any "overcooking" operation.

The compositions according to the invention are characterized in that the required improvement is obtained by introducing into the lithium ferrite a molar proportion of silica $SiO_2$ between 0 and 5 percent. The lithium ferrites according to the invention have a molar composition within the following range:

$Fe_2O_3$: 50–80 percent; $Li_2O$: 8–18 percent

MgO, $Al_2O_3$, CaO, $Cr_2O_3$, NiO, CuO, ZnO, CdO: 0–10 percent

MnO: 0–40 percent $SiO_2$: 1 to 5 percent.

According to a further feature of the invention, in order to prevent the dissociation of the lithium oxide, the temperature of 1,200° C. is never exceeded in the course of the preparation.

The invention will be further explained by means of examples.

Two compositions are given below by way of nonlimiting examples for the case of toroidal cores, the first example being typical of the improvement achieved by the invention, with regard to the control intensity, the second with regard to the switching time. For either of them, the way of preparation used has been shown, as well as the characteristics of the cores produced.

EXAMPLE 1

The following oxides are mixed in the following molar ratios:

$Li_2O$: 14 percent; $Fe_2O_3$: 80 percent;

MnO: 4.5 percent; $SiO_2$: 1.5 percent.

These oxides are ground in jars, with steel balls for 24 hours in pure ethyl alcohol. The dried mixture is then sintered for two hours at 1,000° C. at ordinary air. The resulting powder is again ground for 14 hours in distilled water and undergoes a granulation to obtain grains of 50 to 80$\mu$ and is then pressed into toroidal cores with an outer diameter of 1.3 mm. and a thickness of 0.45 mm. (once sintered).

The sintering of these cores takes place in a tunnel furnace in an atmosphere of pure oxygen. The duration of the passage through the tunnel is some 10 hours and the maximum temperature about 1,175° C.

For all known compositions, such a preparation would conduct to a control current exceeding 700 ma.

EXAMPLE 2

A composition comprising oxides in the following molar ratios:

$Fe_2O_3$: 76.5 percent; $Li_2O$: 13.5 percent

MnO: 7.3 percent; ZnO: 0.5 percent $SiO_2$: 2.2 percent,
is ground in ethyl alcohol for 24 hours, then, after drying presintered at 1,000° C. in the air for 2 hours.

After a second grinding in distilled water, the dried powder is pressed into toroidal cores whose dimensions after sintering are as follows: outer diameter 0.50 mm., thickness 0.13 mm.

The obtained cores are then heated to about 1,100° C. for 15 minutes, in an atmosphere of 20 percent oxygen and 80 percent nitrogen and then, quickly reduced to ambient temperature.

With the same sintering temperature, the known compositions would result in switching time characteristics which would be unacceptable for memories.

The following results have been obtained with the above examples:

(1)

| | |
|---|---|
| Molar percent: | |
| $Fe_2O_3$ | 80 |
| $Li_2O$ | 14 |
| MnO | 4.5 |
| ZnO | --------- |
| $SiO_2$ | 1.5 |
| In | 550 |
| $Tr=Tf$ | 0.4 |
| T*d* | 1.5 |
| T*p* | 0.65 |
| Ts | 1.2 |
| *u*V1 | ≥48 |
| *d*V1 | ≥48 |
| *d*V*z* | ≤9 |
| $\frac{d(uV1)^*}{(uV1)d\theta}$ | 2.2 $10^{-3}$ |

(2)

| | |
|---|---|
| Molar percent: | |
| $Fe_2O_3$ | 76.5 |
| $Li_2O$ | 13.5 |
| MnO | 7.3 |
| ZnO | 0.5 |
| $SiO_2$ | 2.2 |
| I*n* | 850 |
| $Tr=Tf$ | 0.05 |
| T*d* | 0.25 |
| T*p* | 0.125 |
| T*s* | 0.230 |
| *u*V1 | ≥29 |
| *d*V1 | ≥29 |
| *d*V*z* | ≤5 |
| $\frac{d(uV1)^*}{(uV1)d\theta}$ | 1.6 $10^{-3}$ |

Range of temperatures of use:
(1) between 0°and 80° C.; (2) between 0°and 100° C.

The intensity is expressed in: ma., the voltages in: mv. and the times in: $\mu$s.

* Curie point above 500° C.

What is claimed is:

1. A sintered lithium ferrite composition for magnetic memory elements, having a rectangular hysteresis curve and a Curie point above 500° C. and comprising by mole percent: $Fe_2O_3$: 50 to 80 percent; $Li_2O$: 8 to 18 percent; at least one oxide from the following group: MgO, $Al_2O_3$, CaO, $Cr_2O_3$, NiO, CuO, ZnO, CdO: 0 to 10 percent; $SiO_2$: one of the specific amounts 1.5 percent and 2.2 percent; MnO: 0 to 40 percent, and sintered at a temperature not exceeding 1,200° C., in an atmosphere containing oxygen.

2. A sintered lithium ferrite composition as claimed in claim 1, comprising by mole percent: $Li_2O$: 14 percent; $Fe_2O_3$: 80 percent; MnO: 4.5 percent; $SiO_2$: 1.5 percent, the sintering temperature being of about 1,175° C., and the sintering atmosphere being pure oxygen.

3. A sintered lithium ferrite composition as claimed in claim 1, comprising by mole percent: $Fe_2O_3$: 76.5 percent; $Li_2O$: 13.5 percent; MnO: 7.3 percent; ZnO: 0.5 percent; $SiO_2$: 2.2 percent; the sintering temperature being of about 1,100° C. and the sintering atmosphere containing 20 percent oxygen and 80 percent nitrogen.

4. A process for manufacturing sintered ferrite compositions for magnetic cores having rectangular hysteresis cycle comprising the steps of mixing by mole percent: $Fe_2O_3$: 50 to 80 percent; $Li_2O$: 8 to to 18 percent; at least one oxide chosen from the group MgO, $Al_2O_3$, CaO, $Cr_2O_3$, NiO, CuO, ZnO, CdO: 0 to 10 percent; $SiO_2$ one of the specific amounts 1.5 percent and 2.2 percent; MnO: 0 to 40 percent, grinding said mixture in ethyl alcohol, presintering it for 2 hours at a temperature lower than 1,100° C., in atmosphere containing oxygen; grinding in distilled water, pressing and sintering in atmosphere containing oxygen at a temperature not exceeding 1,200° C.